UNITED STATES PATENT OFFICE.

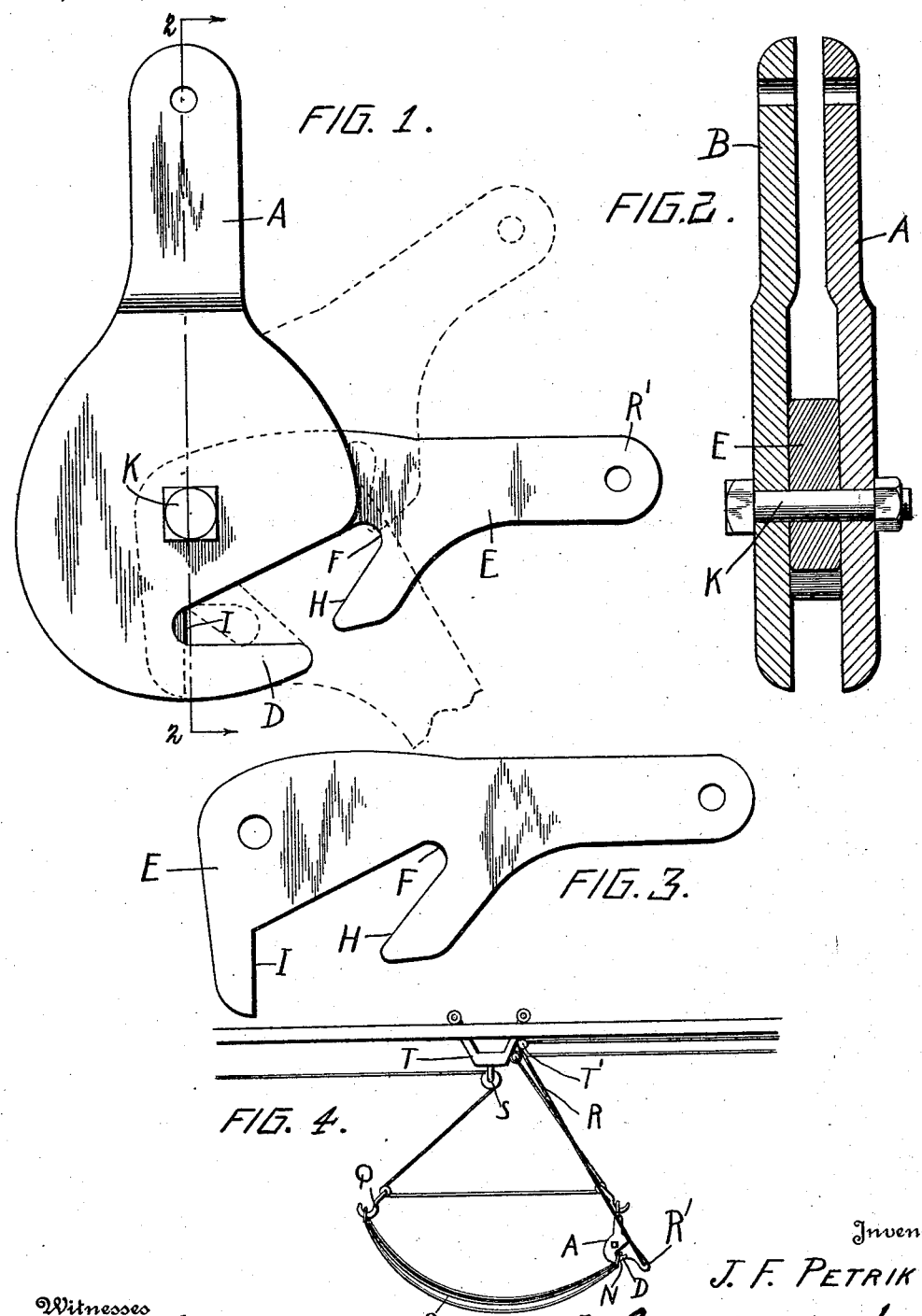

JOSEPH F. PETRIK, OF TABOR, SOUTH DAKOTA.

SLING ATTACHMENT FOR MOTORS.

1,188,312.  Specification of Letters Patent.  Patented June 20, 1916.

Application filed October 7, 1915. Serial No. 54,662.

*To all whom it may concern:*

Be it known that I, JOSEPH F. PETRIK, a citizen of the United States, residing at Tabor, in the county of Bonhomme and State of South Dakota, have invented certain new and useful Improvements in Sling Attachments for Motors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sling holding devices for hay loading apparatus and consists in the provision of a simple and efficient device of this nature having various details of construction, combinations and arrangements of parts which will be hereinafter fully described, shown in the accompanying drawings and then specifically defined in the appended claim.

My invention is illustrated in the accompanying drawings, in which:

Figure 1 is a side elevation showing the application of the invention, parts being shown in solid and dotted lines. Fig. 2 is a cross sectional view on line 2—2 of Fig. 1, and Fig. 3 is a detail view of a pivotal hook member.

Reference now being had to the details of the drawings by letter, A and B designate two plates which are spaced apart, provided each with registering hooks D. A plate E is pivotally mounted upon a pin K passing through registering apertures in the plates A, B and E, the two plates being spaced apart sufficiently to allow the plate E to turn freely between the same. Said plate E has a recess F formed therein, one marginal edge of which is angular and designated by letter I, while the opposite edge H is slightly curved and serves to retain the sling rings engaged over the hooks D.

N designate rings which are adapted to be caught over the hook D and to which ends of slings O are fastened. A rope R is fastened at R' to the contracted shank end of the plate E and is adapted to pass over a pulley S upon the shank portion of a plate A and is designed to be secured to a carrier T carrying a pulley T', said cable also passing about a hook Q to which the other ends of the rings of the sling are adapted to be held.

The operation of my invention will be readily understood and is as follows:—When the parts are assembled in the manner shown and described, the sling rings at corresponding ends of the sling are held upon the hook D when the lever is down to the position shown in solid lines. When it is desired to release the rings from the hooks, the operator by pulling upon the rope may cause the plate E to swing to the position shown in dotted lines and in its swinging movement the angled edge of the recess therein will come in engagement with the rings and push the same off the hooks D, the end of the hook first being freed by the curved edge H drawing away from the ends of said hooks.

What I claim to be new is:—

A sling attachment for motors comprising two stationary plates which are spaced apart and provided with shank portions and registering notches, the upper edges of which latter are inclined and the lower edges horizontal, a pin passing through said plates and a hook having a shank portion pivoted to said pin between said plates and having a notch, one edge of which is angular and its inner end rounded and adapted to coöperate with the notches in said plates to retain a connecting ring, a contracted space interposed between the shank portions of the plates, the shank portion of said hook adapted to engage said space and provided with an aperture adapted to register with apertures in the shank portions of the plates to receive a pin.

In testimony whereof I hereunto affix my signature in presence of two witnesses.

JOSEPH F. PETRIK.

Witnesses:
 AL. JAZARVSKI,
 FRANK DOSTAL.

Copies of this patent may be obtained for five cents each, by addressing the "Commissioner of Patents, Washington, D. C."